(12) United States Patent
Scheldorf et al.

(10) Patent No.: US 9,109,937 B2
(45) Date of Patent: Aug. 18, 2015

(54) LEVEL MEASUREMENT OF PROCESS FLUID USING A REMOTE SEAL

(75) Inventors: Jay Scheldorf, Bellville, TX (US); Gokhan Aydar, Austin, TX (US); Blake Becker, Brenham, TX (US); Derek Poehlmann, Brenham, TX (US); Bruce Muske, Burton, TX (US)

(73) Assignee: Rosemount Inc., Chanhassen, MN (US)

( * ) Notice: Subject to any disclaimer, the term of this patent is extended or adjusted under 35 U.S.C. 154(b) by 403 days.

(21) Appl. No.: 13/565,305

(22) Filed: Aug. 2, 2012

(65) Prior Publication Data

US 2014/0033817 A1 Feb. 6, 2014

(51) Int. Cl.
*G01F 23/00* (2006.01)
*G01F 23/14* (2006.01)
*G01F 23/16* (2006.01)
*G01L 7/06* (2006.01)

(52) U.S. Cl.
CPC .............. *G01F 23/14* (2013.01); *G01F 23/164* (2013.01); *G01L 7/06* (2013.01)

(58) Field of Classification Search
USPC .......................................................... 73/299
See application file for complete search history.

(56) References Cited

U.S. PATENT DOCUMENTS 4,377,809 A * 3/1983 Lawford ...................... 340/623
4,972,710 A * 11/1990 Uhlarik et al. ................. 73/292
5,105,662 A * 4/1992 Marsh et al. .................... 73/299
5,324,048 A * 6/1994 Carmody ....................... 277/367
6,298,721 B1 * 10/2001 Schuppe et al. ................ 73/299

FOREIGN PATENT DOCUMENTS

| GB | 639 477 | 6/1950 |
| GB | 2 098 328 | 11/1982 |
| WO | WO 03/102515 | 12/2003 |

OTHER PUBLICATIONS

ANSI/ASME B1.20.1-1983 NPT.*
Leser LLC Compact Performance Catalog (2005).*
International Search Report and Written Opinion of International Searching Authority, or the Declaration dated Oct. 23, 2013 for International Appln. No. PCT/US2013/049628, dated Oct. 23, 2013.
Deltapilot S DB50/50L/51/52/53, "Hydrostatic Level Measurement Pressure sensor with CONTITE (TM) measuring cell; waterproof, climatic-proofed, long-term stability; for food, fresh water and wastewater, chemical and pharmaceutical products", Endress+Hauser, 2008, 60 pages.

(Continued)

*Primary Examiner* — Andre Allen
(74) *Attorney, Agent, or Firm* — Westman, Champlin & Koehler, P.A.

(57) ABSTRACT

An apparatus is provided for measuring level of a process fluid in a container opening. The apparatus includes a remote seal configured to be inserted into the container through an opening and configured to receive a pressure related to the level of process fluid in the container. A capillary tube filled with a fill fluid extends from the remote seal to the opening and is configured to convey the pressure therebetween. A pressure sensor coupled to the capillary tube senses the pressure from the capillary tube and responsively determines the level of the process fluid in the container. The remote seal includes a bellows portion arranged to isolate the process fluid from the fill fluid in the capillary tube and convey the pressure therebetween.

15 Claims, 4 Drawing Sheets

(56) References Cited

OTHER PUBLICATIONS

Mobrey 9700 Transmitter, "Mobrey 9700 Transmitter Submersible Hydrostatic Level Transmitters", Product Data Sheet, IP0078, Rev BA, Feb. 2012, Emerson Process Management, 12 pages.

Mobrey, "The level solutions catalogue", Emerson Process Management, Oct. 2005, 8 pages.

Mobrey, "Mobrey Series 9700 Hydrostatic level transmitter", Instruction leaflet, IP341, Rev. AD, Aug. 2011, Emerson Process Management, 12 pages.

* cited by examiner

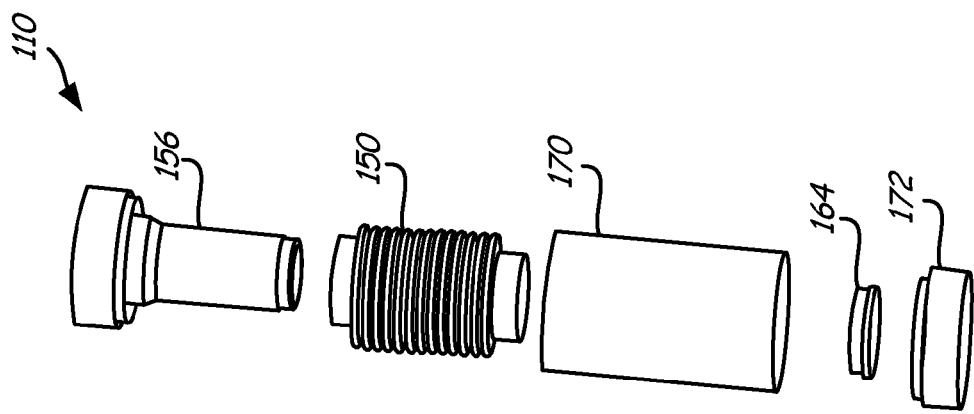
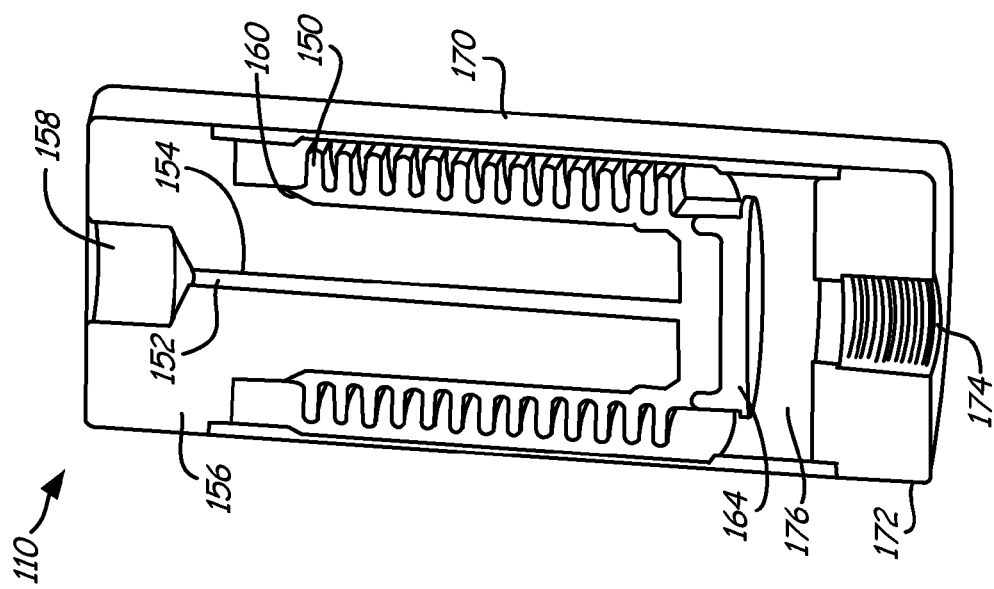

LEVEL MEASUREMENT OF PROCESS FLUID USING A REMOTE SEAL

BACKGROUND

The present invention relates to the measurement of the level of a process fluid in a container. More specifically, the invention relates to measurement of level of process fluid based upon pressure.

Many industrial processes require the monitoring of various process variables related to a process fluid. One example process variable which is monitored is the level of a process fluid within a container. This information can be used for maintaining an inventory of the process fluid, or can be used in controlling operation of a process.

Various techniques are known for measuring the level of process fluid in a container. One technique for measuring process fluid level is based upon a pressure, for example, a differential pressure. In one example configuration, a side access port is provided near the bottom of the container. The pressure of the process fluid at this location is measured using a pressure sensor. For example, an isolation diaphragm can couple to the side access port and used to convey the process pressure to a pressure sensor. This isolation diaphragm isolates the sensor from the process fluid. The sensed pressure is related to the level of fluid in the container and measurement circuitry coupled to the sensor can provide an output related to this level.

Some containers which are used to contain process fluid do not have the side access port discussed above for coupling to a pressure sensor. In such a configuration, the only available access port may be located at the top of the container and any level measurements must be performed through this opening.

SUMMARY

An apparatus is provided for measuring level of a process fluid in a container opening. The apparatus includes a remote seal configured to be inserted into the container through an opening and configured to receive a pressure related to the level of process fluid in the container. A capillary tube filled with a fill fluid extends from the remote seal to the opening and is configured to convey the pressure therebetween. A pressure sensor coupled to the capillary tube senses the pressure from the capillary tube and responsively determines the level of the process fluid in the container. The remote seal includes a bellows portion arranged to isolate the process fluid from the fill fluid in the capillary tube and convey the pressure therebetween.

BRIEF DESCRIPTION OF THE DRAWINGS

FIG. 2A is side cross sectional view and FIG. 2B is an exploded perspective view of an isolator bellows assembly used by the level measurement system of claim 1.

DETAILED DESCRIPTION OF ILLUSTRATIVE EMBODIMENTS

The present invention provides an apparatus and method for measuring level of a process fluid in a container (or "tank") based upon pressure within the container. In the present invention, a "remote seal" is configured to be placed in the process fluid in the container. This remote seal conveys a pressure in the container to a pressure sensor through an elongated capillary tube filled with a fill fluid. The pressure sensor is connected to measurement circuitry, which uses the sensed pressure to determine process fluid level. The fill fluid is isolated from the process fluid by a bellows arrangement. The accuracy of the pressure measurement is related to the surface area of the isolator. This bellows configuration increases the surface area of the isolator through which the pressure is conveyed to the fill fluid in comparison to a circular diaphragm having the same diameter. With a diaphragm arrangement, the accuracy of pressure measurements may be limited if the opening at the top of the container is relatively small thereby permitting only a relatively small diameter diaphragm to pass through. In contrast, with the use of the bellows arrangement, the same diameter opening provides access to an isolator assembly having a greater surface area and therefore improved accuracy.

Figure 1:
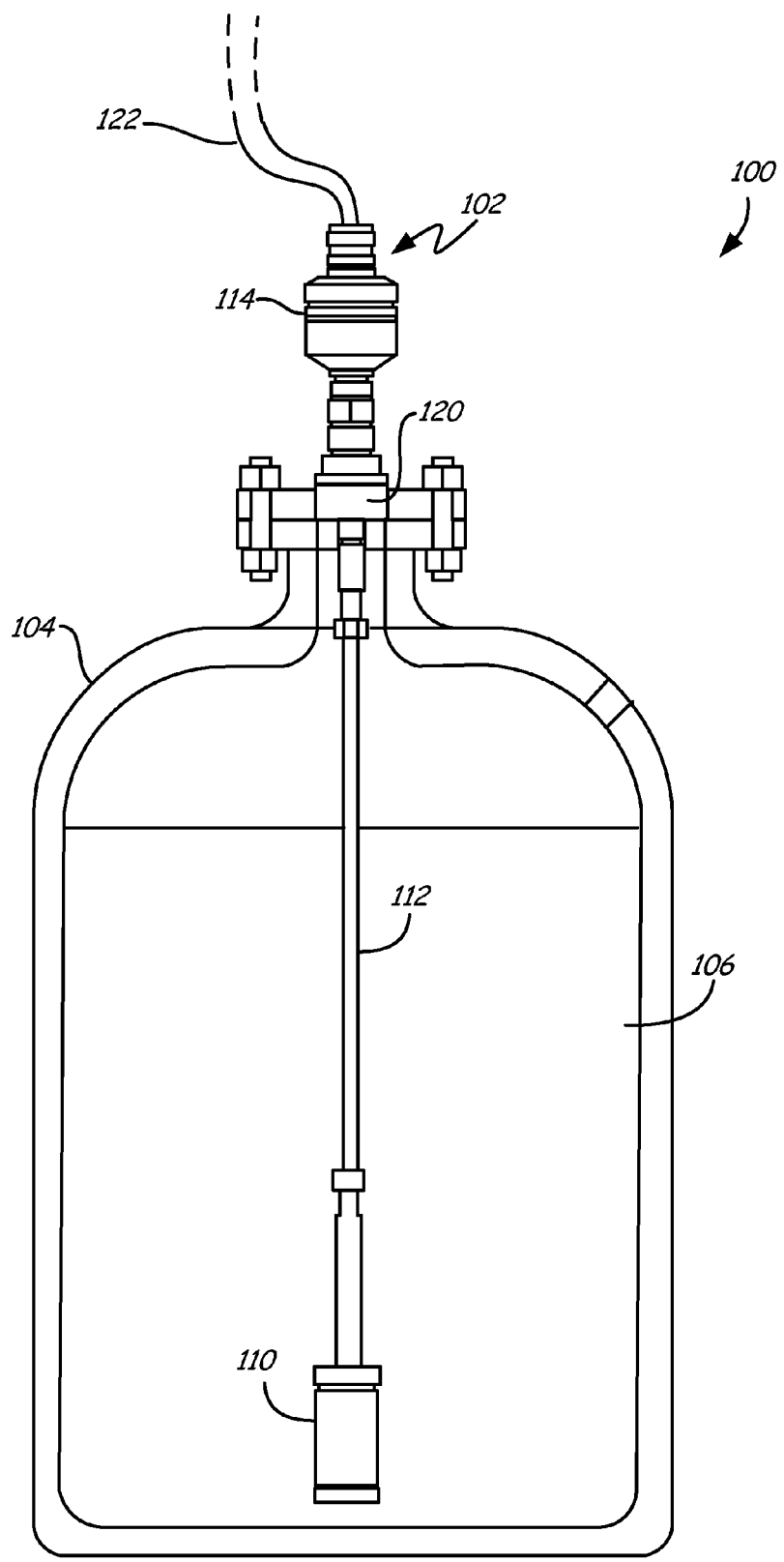
FIG. 1 is a cross sectional view of a container and process fluid level measurement apparatus of the present invention.

FIG. 1 is an example view of an environment 100 in which the level measurement system may be implemented. In FIG. 1, a side cross-sectional view of a container 104 is shown in which a pressure based level measurement device 102 is configured to measure the level of process fluid 106 in container 104. In FIG. 1, a remote seal 110 is positioned proximate the bottom of the container 104. The remote seal 110 receives a pressure at this location which is conveyed to a pressure sensor (not shown in FIG. 1) carried in housing 114 of measurement device 102 which is positioned at the top of container 104. It is noted that the pressure sensor is typically located outside the fluid containing portion of the container (on the outside of the top of the container). This pressure is conveyed through a fill fluid carried in capillary tube 112 which extends between remote seal 110 and a process coupling 120. Remote seal 110 operates to isolate the process fluid 106 from the fill fluid carried in capillary tube 112, while still transferring the applied pressure therebetween. Based upon the measured pressure, the level measurement device 102 provides an output related to the level of the process fluid 106 in container 104. For example, this output can be provided on a two wire process control loop 122. Loop 122 may operate in accordance with known techniques such as a 4-20 mA current loop in which a 4 mA represents a low value of a sensed process variable and a 20 mA signal represents a high value. The same two wires can be used to provide power to the level measurement device 102. Another example of two wire process control loop is in accordance with the HART® communication standard in which a digital signal can also be modulated on to the loop 122. Another alternative embodiment of loop 122 is a wireless process control loop in which information is communicated wirelessly, for example, using radio frequency signals such as specified in IEC 62591 (WirelessHART®).

FIG. 2A is a side cross-sectional view of one embodiment of remote seal 110 and FIG. 2B is an exploded perspective view of remote seal 110. As discussed above, one embodiment of the remote seal 110 includes a bellows portion 150 configured to transfer applied pressure from the process fluid 106 to fill fluid 152 carried in a capillary extension 154. Capillary extension 154 couples to capillary tube 112 shown in FIG. 1 through fitting 158. In this embodiment, the bellows portion 150 is bonded at bond 160 to a seal body 156 which carries capillary extension 154. Fitting 158 is provided to receive the elongated capillary tube 112 which extends to housing 114. Bond 160 can comprise, for example, a resistance seam weld or the like. The fill fluid 152 carried in capillary extension 154 also fills the void region which is provided in the spacing between the bellows portion 150 and the seal body 156. Fill fluid 152 is preferably an incompressible fluid having a volume which is not changed substantially based upon pressure. For example, an oil or the like may be used. The end of the bellows portion 150 is sealed by an end cap 164. Outer housing 170 surrounds and protects the bellows portion 150. The outer housing 170 is preferably sealed with a housing cap 172. A cap opening 174 is provided in housing cap 172 to allow process fluid 106 to enter housing cavity 176 and thereby apply pressure to the bellows portion 150. End cap 164 may also be welded, for example resistance seam welded, to the end of bellows portion 150 as may housing end cap 172 to housing 170. Cap opening 174 is preferably threaded, and may also be used to couple to a pressure source for use in calibrating the device 102.

During operation, as the process fluid 106 applies pressure to the bellows portion 150, the bellows portion 150 will move with respect to seal body 156. This causes bellows portion 150 to transfer the applied pressure to the fill fluid 152 carried in the volume between bellows portion 150 and seal body 156. The seal body 156 acts as a volume fill slug to reduce the total volume of fill fluid 152. This reduces temperature effects on the pressure transmitted through the capillary extension 154 and improves accuracy of the pressure measurements. In this configuration, bellows portion 150 and end cap 164 provide an isolator assembly which isolates the fill fluid 152 from the process fluid 106. The surface area of this isolator assembly is greater than the surface area of a circular diaphragm having the same diameter. This increases the overall sensitivity to applied pressure of the remote seal 110 in comparison to an isolation assembly using only a circular diaphragm having the same diameter and provides improved accuracy in pressure measurements. Thus, the present invention provides an isolator assembly which is capable of fitting through a small housing opening/process coupling 120 in container 104 in comparison to a circular diaphragm based isolator assembly having the same diameter.

Figure 3:
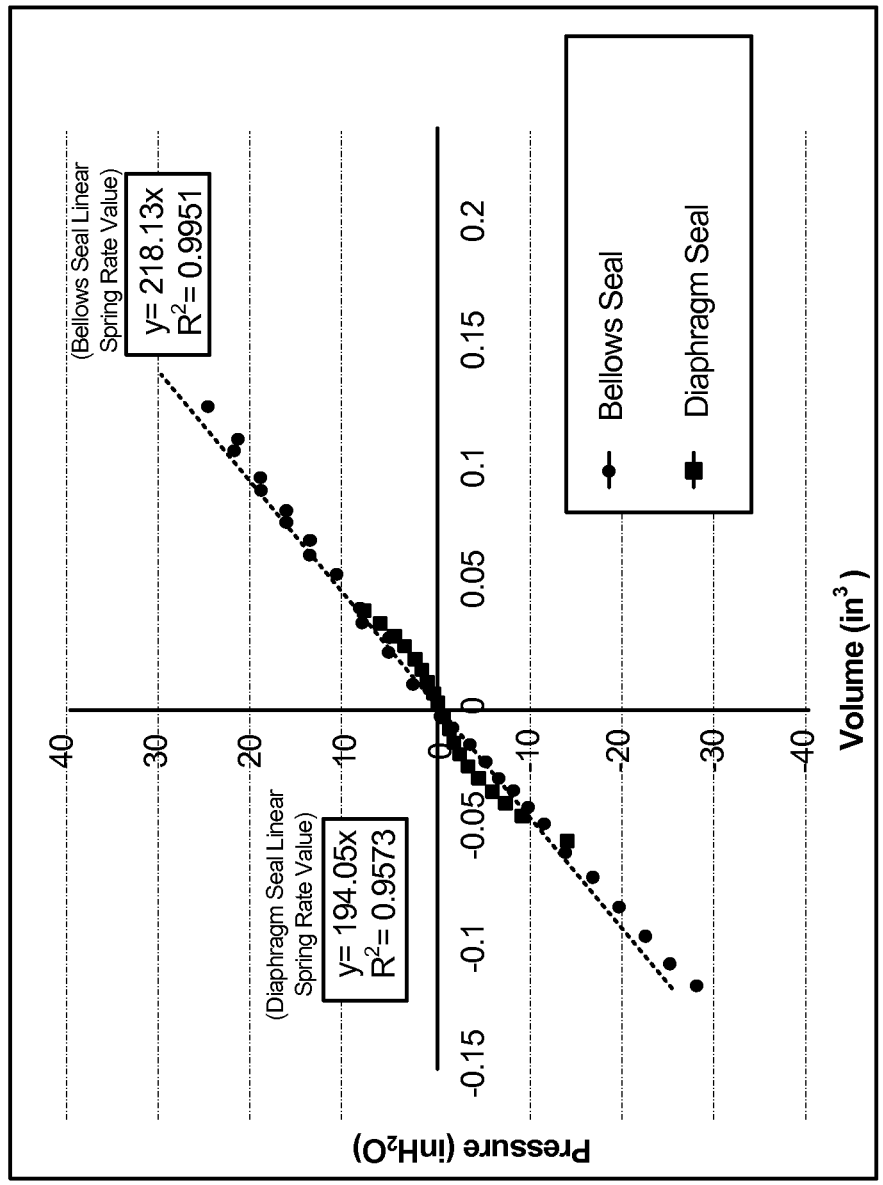
FIG. 3 is a graph of pressure versus volume for both the bellows type arrangement shown in FIGS. 2A and 2B as well as a traditional diaphragm type process fluid isolator.

FIG. 3 is a graph of pressure versus volume showing a comparison between the remote seal 110 having the bellows portion 150 of the present invention in comparison to a traditional diaphragm based remote seal having a diameter which is larger than the diameter of the bellows. As illustrated in FIG. 3, the sensitivity to applied pressure for the bellows based remote seal (referred to as the "linear spring rate value") is only about twelve percent (12%) less than that of a traditional diaphragm design. However, the relationship between pressure and volume for the bellows based design of the invention is more closely a straight line. This makes characterization of the device easier and allows for temperature variations to be more accurately compensating thereby leading to more accurate pressure measurements.

Figure 4:
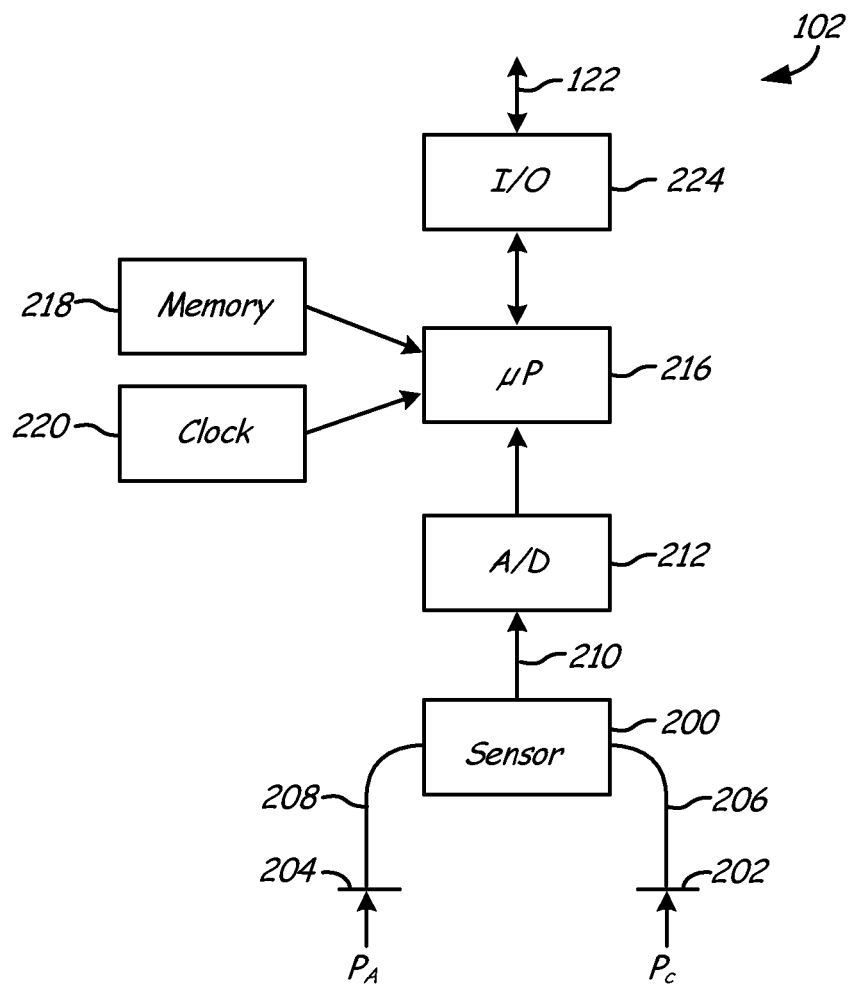
FIG. 4 is a simplified block diagram of a process fluid level measurement apparatus.

FIG. 4 is a simplified block diagram of level measurement device 102 coupled to container 104 (not shown in FIG. 4) through process coupling 120. Device 102 includes a pressure sensor 200 configured to sense a differential pressure. Sensor 202 is a gauge pressure sensor referenced to Atmosphere. In the configuration shown in FIG. 4, one side of the pressure sensor 200 couples to a pressure $P_C$ which is the container pressure conveyed through capillary tube 112 from the bottom of the container 104. The other side of the pressure sensor 200 couples to an atmospheric pressure $P_A$. In the configuration of FIG. 4, pressures $P_C$ and $P_A$ couple to pressure sensor 200 through isolation diaphragms 202 and 204 and capillary tubes 206 and 208, respectively. Thus, in the case of pressure $P_T$, the pressure is conveyed through a fill fluid 152 in capillary tube 112, across isolation diaphragm 202 to a secondary fill fluid carried in capillary 206 and thereby applied to pressure sensor 200. Note that isolators and fill tubes may not both be required and any appropriate configuration can be used. Pressure sensor 200 provides an output 210 to an analog to digital converter 212 which is representative of a pressure difference between the pressure received by the remote seal 110 shown in FIG. 1 and the atmospheric pressure. Pressure sensor 200 may operate in accordance with any appropriate technique, for example, the deflection of a deflectable diaphragm can be sensed based upon a change in capacitance. The output 210 from sensor 200 is representative of a level of process fluid 106 carrying container 104. Analog to digital converter 212 provides a digital output indicative of this sensed pressure to a microprocessor 216. Microprocessor 216 operates based upon instructions stored in memory 218 at a rate determined by clock 220. For example, the memory 218 may store information which is used by microprocessor 216 to convert the output from analog to digital converter 212 into values indicative of the level of the process fluid 106 in container 104 shown in FIG. 1. This conversion can be based upon the type of process fluid 106, the temperature, and the sensed pressure differential. When the output is compensated based upon the temperature, an additional temperature sensor (not shown) can be included. Microprocessor 216 can communicate with a remote location using input/output circuitry 224. For example, data can be transmitted to another location such as a process control room or monitoring station. The data is communicated on a process control loop 122. In one configuration, the process control loop comprises a 4-20 mA process control loop in which a current level on the loop is controlled to provide a representation of the sensed level. In another configuration, digital information can be modulated onto the process control loop 122 to provide additional information, carry instructions or commands, etc. This may be, for example, in accordance with the HART® communication protocol. The process control loop 122 can also be used to provide power to the level measurement device 102. Thus, the same two wires can be used both for the transmission of information as well as powering the device 102. The loop 122 is not limited to the examples described above. In another example, the loop 122 provides wireless communication. For example, the loop 122 can operate in accordance with the WirelessHART® communication protocol in accordance with the IEC 62591 Standard.

Although the present invention has been described with reference to preferred embodiments, workers skilled in the art will recognize that changes may be made in form and detail without departing from the spirit and scope of the invention. Although the above descriptions show a single differential pressure sensor, in another example embodiment, two separate pressure sensors are employed and the difference between their two outputs is used in determining level of process fluid. The capillary tube 112 can be carried in a flexible or rigid sheathing. If a flexible sheathing is used, the tube 112 can be coiled for storage or transportation. The capillary tube 112 can be filled with fill fluid 158 once it is assembled between process coupling 120 and remote seal 110. For example, a vacuum can be applied to the fill tube 112 to evacuate air from the tube, and then the tube 112 filled with the fill fluid 152. Once this is complete, any ports used for this process can be sealed. As used herein, a "bellows" refers to a flexible assembly which defines a variable volume therein. This is in contrast to a diaphragm which does not define (or contain) a volume. The specific embodiment disclosed herein illustrates a tubular bellows, however, the present invention is not limited to this configuration. Preferably, a cross sectional area of the bellows portion 150 is sufficiently small to fit through opening 120 in container 104. The fill fluid 152 in the capillary 112 can be selected as appropriate. Examples include silicon oil, proplylene glycol and water, glycerin and water, white mineral oil, etc. The bellows configuration of the present invention can be used to reduce the isolator stiffness in comparison with a diaphragm having the same diameter. The end cap 164 can be configured to extend beyond the diameter of the bellows portion 150 and thereby used to align and stabilize the bellows portion 150 within the housing 170. The process coupling 120 can comprise a coupling which fits into a standardized NPT coupling such as a 1.5 inch NPT process connection. With the present invention, the bellows provides a surface area which is responsive to applied pressure which is greater than a perpendicular cross sectional area through the remote seal. Further, the pressure responsive surface area of the bellow can be greater than an area provided by the opening at the top of the tank through which the remote seal is introduced into the tank.

What is claimed is:

1. An apparatus for measuring level of a process fluid in a container, the container having an opening, the apparatus comprising:
    a remote seal configured to be inserted into the container through the opening and configured to receive a pressure from the process fluid related to the level of process fluid in the container;
    a capillary tube filled with a fill fluid which extends from the remote seal to the opening in the container and configured to convey the pressure therebetween; and
    a pressure sensor coupled to the capillary tube configured to sense the pressure from the capillary tube which is related to level of the process fluid in the container;
    wherein the remote seal includes a bellows portion arranged to isolate the process fluid from the fill fluid in the capillary tube and convey the pressure therebetween, the remote seal further includes a seal body contained at least partially within the bellows portion configured to reduce a volume of fill fluid carried in the bellows portion.

2. The apparatus of claim 1 wherein the remote seal includes an end cap configured to seal an end of the bellows portion.

3. The apparatus of claim 1 wherein the remote seal includes a protective housing which contains the bellows portion therein, the protective housing including an opening thereby exposing the bellows portion to the process fluid.

4. The apparatus of claim 3 wherein the opening is further configured for use in characterizing pressure measurement by the pressure sensor.

5. The apparatus of claim 1 wherein the bellows portion comprises stainless steel.

6. The apparatus of claim 1 wherein the pressure sensor couples to the capillary tube at a process coupling positioned at a top of the container.

7. The apparatus of claim 6 wherein the process coupling includes a NPT coupling.

8. The apparatus of claim 1 wherein the capillary tube extends vertically between the remote seal at a bottom location in the container and the pressure sensor at a location adjacent the top of the container.

9. The apparatus of claim 1 including an isolation diaphragm which isolates the fill fluid in the capillary tube from a secondary fill fluid located between the isolation diaphragm and the pressure sensor.

10. The apparatus of claim 1 wherein the pressure sensor comprises a gauge pressure sensor referenced to Atmosphere.

11. The apparatus of claim 1 wherein a surface area of the bellows portion is responsive to applied pressure from the process fluid and is greater than a perpendicular cross sectional area through the remote seal.

12. A method for determining level of a process fluid in a container, the method comprising:
    placing a remote seal at a lower location in the container;
    applying a pressure to a bellows portion of the remote seal;
    providing a seal body contained at least partially within the bellows portion and configured to reduce a volume of fill fluid carried in the bellows portion;
    communicating that pressure through a capillary tube to an area adjacent the upper location of the container;
    sensing the pressure at the area adjacent the upper location of the container using a pressure sensor;
    converting the sensed pressure to a digital representation of pressure; and
    calculating level of process fluid in the container based upon the digital representation.

13. The method of claim 12 including characterizing pressure measurements through an opening in a housing which contains the bellows portion.

14. The method of claim 12 wherein the pressure sensor comprises a gauge pressure sensor referenced to Atmosphere.

15. The method of claim 12 including providing an isolation diaphragm which isolates a fill fluid in the capillary tube with a secondary fill fluid located between the isolation diaphragm and the pressure sensor.

* * * * *